United States Patent [19]

Nakajima et al.

[11] Patent Number: 5,537,492
[45] Date of Patent: Jul. 16, 1996

[54] PICTURE COMPRESSING AND RESTORING SYSTEM AND RECORD PATTERN FORMING METHOD FOR A SPATIAL LIGHT MODULATOR

[75] Inventors: Takayuki Nakajima; Shigeru Chiba, both of Toride; Shun-ichi Sato, Kashiwa; Akio Suwa, Sakura, all of Japan

[73] Assignee: Sharp Kabushiki Kaisha, Osaka, Japan

[21] Appl. No.: 66,588

[22] Filed: May 25, 1993

[30] Foreign Application Priority Data

May 27, 1992 [JP] Japan .................................. 4-160174

[51] Int. Cl.[6] .............................. G06K 9/00; G06K 9/36
[52] U.S. Cl. ........................... 382/232; 382/212; 382/56; 382/32
[58] Field of Search .................................. 358/432, 433; 348/395, 403; 364/715.02; 359/560, 561; 382/210, 212, 278, 279, 232

[56] References Cited

U.S. PATENT DOCUMENTS

| | | | |
|---|---|---|---|
| 4,005,385 | 1/1977 | Joynson et al. | 382/43 |
| 4,590,608 | 5/1986 | Chen et al. | 382/43 |
| 4,892,370 | 1/1990 | Lee | 350/3.74 |
| 4,892,408 | 1/1990 | Pernick et al. | 382/31 |
| 5,080,464 | 1/1992 | Toyoda | 382/31 |
| 5,107,351 | 4/1992 | Leib et al. | 382/31 |
| 5,216,529 | 6/1993 | Paek et al. | 382/31 |
| 5,235,439 | 8/1993 | Stoll | 382/31 |
| 5,262,979 | 11/1993 | Chao | 382/42 |
| 5,327,286 | 7/1994 | Sampsell et al. | 382/42 |
| 5,339,305 | 8/1994 | Curtis et al. | 382/31 |

FOREIGN PATENT DOCUMENTS

| | | |
|---|---|---|
| 57-10123 | 1/1982 | Japan . |
| 2120917 | 5/1990 | Japan . |
| 2127625 | 5/1990 | Japan . |

OTHER PUBLICATIONS

Decker, "Hadamard–Transform Image Scanning" *Applied Optics*, vol. 9, No. 6, Jun., 1970. pp. 1392–1395.

"Fundamental Study on a Microoptic Image Preprocessor Composed of a Planar Microlens Array" by A. Akiba, K. Murashige & K. Iga, Precision & Intelligence Laboratory, Tokyo Institute of Technology, May 20, 1991, pp. 507–513.

"Some New Results in Hybrid Acousto–Optic Processing" by P. Goutin, P. Logette, J. M. Rouvaen, and E. Bridoux, IIEE 1992 Ultrasonics Symposium Proceedings, Oct. 20–23, 1992; pp. 493–496.

"Experimental Implementation of an Optoelectronic Matrix-–Matrix Multiplier Which Incorporates Holographic Multiple Imaging" by A. G. Kirk, S. Jamieson, H. Imam, T. J. Hall; Optical Computing and Processing, 1992, vol. 2, No. 4, London GB, Received 23 Oct. 1992; pp. 293–304.

"Acousto–Optic Techniques for Information Processing Systems" by John N. Lee, Optical Sciences Division, U.S. Naval Research Laboratory, Washington, DC 20375; 1987 IIEE Ultrasonics Symposium, pp. 475–484.

(List continued on next page.)

*Primary Examiner*—Jose L. Couso

[57] ABSTRACT

Total image processing by way of high-speed parallel optical operations. A multiplication device memorizes a series of optical density figures representing a series of orthogonal function patterns and performs optical multiplications upon an original picture in comparison with each of the orthogonal function patterns. A summation device determines the expansion coefficients of the orthogonal functions for the whole original picture from the operation results obtained by the multiplication device. A quantizing and encoding device quantizes and encodes the orthogonal function expanding coefficients obtained by the summation device for compressing the data. The encoded data is transmitted to a picture restoring section which has the same optical system as the picture compressing section. This enables the system to conduct two-way picture encoding and restoring.

21 Claims, 6 Drawing Sheets

OTHER PUBLICATIONS

"Optical Computing in Japan" by Toyohiko Yatagai, Future Generation Computer Systems, Oct. 1988; No. 3, Amsterdam, The Netherlands; pp. 177–187.

"Optical Cosine Transform Using Microlens Array and Phase–Conjugate Mirror" by K. W. Wong and L. M. Cheng; Department of Electronic Engineering, City Polytechnic of Hong Kong; Jpn. J. Appl. Phys. vol. 31 (1992) Pt. 1, No. 5B; Accepted for Publication 18 Apr. 1992; pp. 1672–1676.

"Optical Cosine Transform Using Phase Conjugation Technique" by L. M. Cheng and K. W. Wong; City Polytechnic of Hong Kong, Hong Kong; Third International Conference on Holographic Systems, Components and Applications, 16–18 Sep. 1991; Electronics Division of the Institution of Electrical Engineers; pp. 113–117.

FIG.2
(PRIOR ART)
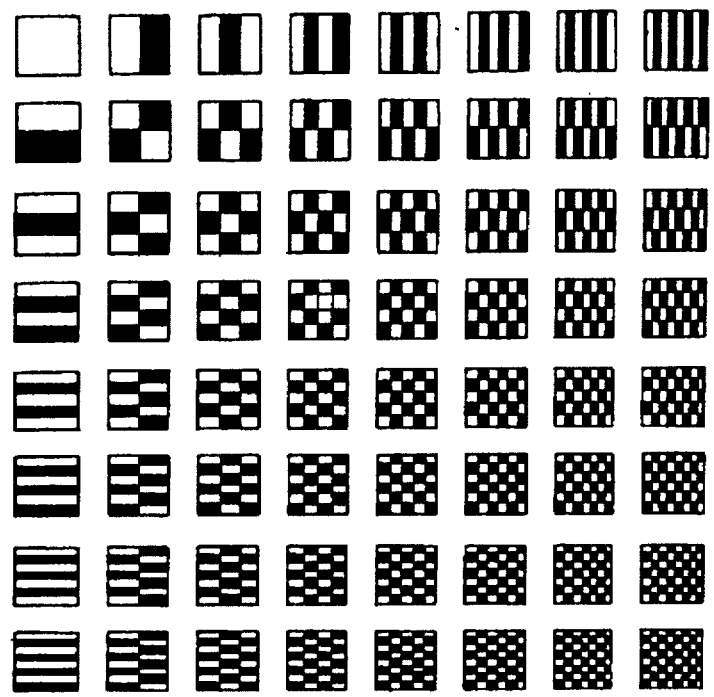
FIG.3
(PRIOR ART)
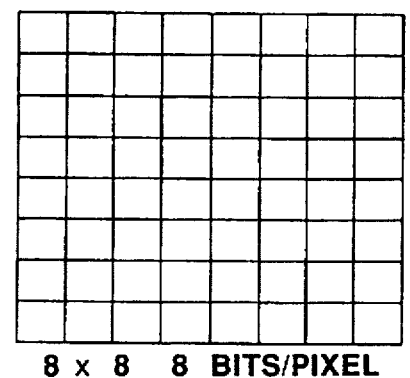
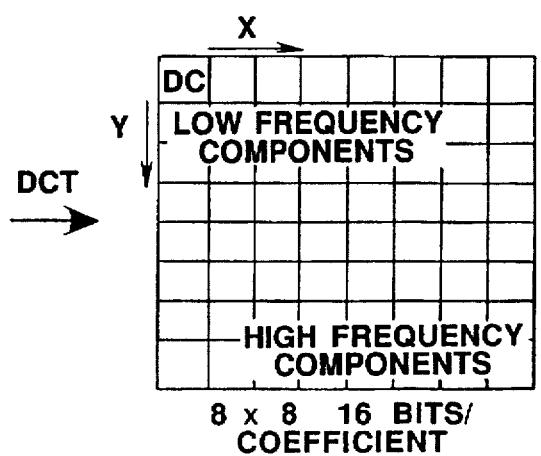

PICTURE COMPRESSING AND RESTORING SYSTEM AND RECORD PATTERN FORMING METHOD FOR A SPATIAL LIGHT MODULATOR

BACKGROUND OF THE INVENTION

The present invention relates to a picture compressing and restoring system and a method for forming a pattern to be recorded inside a spatial light modulator. More particularly, it relates to a picture compressing and restoring system capable of optically compressing and restoring a picture, and which is applicable to image processing e.g., picture phones, TV conferencing etc.

Today's information-oriented society requires the transmission and storage of pictorial data, including a large amount of information, as the most important function of the information age. In processing digitized still-pictures and data it is very difficult to record and transmit a large amount of pictorial data via the existing storage and digital networks. For example, a picture of an A4-sized format includes information of about 26 Mbytes (300 dpi) and one picture on a TV display contains the data of about 30 Mbytes. Accordingly, pictorial data must be compressed by an encoding device prior to recording and transmitting it.

A variety of systems have been proposed for encoding pictorial data and for standardizing the encoding system. Efforts have been made to make the existing media mutually connectable and compatible. In December of 1990, CCITT recommended the system H.261 for encoding the moving pictures of picture phones and at TV conferences. At the end of 1992 JPEG (Joint Photographic Experts Group), a joint session of CCITT and ISO (International Organization of Standardization) recommended that the colored still picture-encoding system be standardized. MPEG (Moving picture Experts Group) of ISO is now in examining systems for encoding moving pictures to be played on VTR systems, and has standardized the encoding system MPEG by which data transmission is carried out at the rate of not more than 1.5 Mbits per second.

DCT (discrete cosine transform) is explained as follows: (The detail of DCT is described in, for example, a handbook on television and pictorial information engineering published by the Ohm Company, Japan, Nov. 30, 1990, pp.115–133, pp.409–413.)

An analog picture is digitized through standardizing and quantizing processings. The standardizing operation is to array picture elements (sampling points) on the picture to get a representation of a variety of luminance levels of the arrayed picture elements, and a quantizing operation to transform the luminous value of each picture element into the corresponding one of eight luminance levels previously created. The compression of the digital pictorial data may be accomplished by any of two methods: the first one is a reversible encoding method allowing for the complete reproduction of the initial digital picture from the compressed data, and the other one is an irreversible encoding method permitting a certain degree of image distortion at the reproduction end of the initial digital picture from the compressed data. The irreversible coding method can compress the data more densely than can the reversible method. The typical make up of the irreversible coding system is such that a digital picture is put into a preprocessing unit wherein it is subjected to filtering for reducing its redundancy and then it is coarsely quantized according to the required picture's quality and coefficient of the data's compression. The quantized output is reversibly coded by, for example, the Huffman encoding method.

The most generally used technique for creating irreversible coding is an anticipatory coding or conversion coding. The conversion coding is effective in the case where a reproduced picture may have a relatively low quality i.e. sampled values are converted to orthogonal coordinates and thereby effective coding is realized by eliminating the correlation of the sampled values. In practice, a picture is divided into small blocks comprising N picture elements x M lines each which are separately converted to corresponding values of an orthogonal coordinating system. The conversion coefficient varies with the frequency components in the range from a direct current to a high frequency. Power concentration is normally observed at the low-frequency components. Accordingly, many bits are distributed to the low-frequency components with due consideration of their visual characteristics while the high-frequency components are coarsely quantized with a lesser number of bits. This reduces the total number of bits for coding.

The orthogonal transformation is featured basically by the concentration of energy at low-frequency components and reflection of edge and line information on high-frequency components. Walsh-Hadamard transform and DCT relate to the orthogonal transformation. DCT is applied with two-dimensional compression of the pictorial data. Sequential transformation and inverse transformation of two-dimensional DCT are expressed respectively by the following equations (1),(2):

Normal transformation
$$F(u,v) = \left( \frac{1}{4} \right) C(u)C(v) \sum_{i=0}^{7} \sum_{j=0}^{7} f(i,j) \quad (1)$$

$$\cos\left\{ (2i+1)\frac{u\pi}{16} \right\} \times \cos\left\{ (2j+1)\frac{v\pi}{16} \right\}$$

Inverse transformation
$$f(i,j) = \left( \frac{1}{4} \right) \sum_{u=0}^{7} \sum_{v=0}^{7} C(u)C(v)F(u,v) \quad (2)$$

$$\cos\left\{ (2i+1)\frac{u\pi}{16} \right\} \times \cos\left\{ (2j+1)\frac{v\pi}{16} \right\}$$

$(u,v = 0,1, \ldots 7)$
$(i,j = 0,1, \ldots 7)$
$C$: Transformation coefficient

An image reproducing system with an array of flat micro-lenses and Walsh's orthogonal expansion system of parallel images, which has Walsh's two-dimensional functional mask, are proposed by Akiba et al. in the "Fundamental study of a micro-optical image preprocessing system using an array of flat micro-lenses", Optics vol. 20, No.8, pp.507–513, August, 1991. The system proposed therein is intended to treat binary imaged character information and comprises of an array of flat micro-lenses, Walsh's functional mask and a CCD camera. An input image is used and a numerical character pattern is adhered to a diffusion plate to be illuminated by transmitting incoherent light from behind. One of the arrayed flat micro-lenses causes rays of light from the input image to meet together at the principal focus to form a real image. The pattern of the rays of light of this image then pass through a series of Walsh's functional masks and converge at a CCD camera and are recorded in an image memory of a computer wherein the light pattern is quantized by a summation on every pixel value. The Walsh's expansion coefficients are determined by subtracting the transmitted light intensity values corresponding to positive and negative portions of Walsh's functions.

The publication of unexamined patent application, JP, A, 57-10123 discloses a light source system which is basically composed of a light source, two acousto-optical modulators, a Fourier transforming lens and a detecting device and which is intended to make a cosine transformation by using a Fourier transform lens for light wave transformation.

In contrast to the above, a device according to the present invention, does not require the use of two acousto-optical modulators and a Fourier transform lens and is capable of executing a discrete cosine transformation according to ON- and summations by means of a converging lens and a mask (spatial filter) which substitutes a basic pattern of a discrete cosine transformation through a variety of transmission.

The publication of unexamined patent application, JP, A, 2-120917 discloses an optical hybrid arithmetic unit which is basically composed of a one-dimensional spatial optical modulator, a two-dimensional spatial light modulator (a spatial filter for discrete cosine transformation meaning a mask with a constant pattern not requiring rewriting), a one-dimensional photoelectric converter, a light source, an optical system for the two-dimensional spatial optical modulator and an optical system for converging to the one-dimensional photoelectric converter. This unit divides a two-dimensional image into picture elements in a vertical or horizontal direction and treats a line or column of one-dimensional images as an input signal as well as an output signal. The unit performs sequential calculations on each line (or column) of and lines (or columns) of pixels of the two-dimensional image thereby causing the problem of time-consuming operations.

The device according to the present invention comprises a two-dimensional spatial light modulator (e.g. a liquid crystal panel) and a two-dimensional photoelectric converter (e.g. a charge-coupled device) instead of the one-dimensional spatial light modulator and the one-dimensional photoelectric converter of the prior art. This device treats a two-dimensional image itself as an input signal as well as an output signal and can execute a discrete cosine transformation of the two-dimensional image itself at one time thereby ensuring high-speed processing.

The publication of unexamined patent application, JP, A, 2-127625 discloses a unit for light discrete cosine transformation and an image-coding device using a unit which is basically composed of a two-dimensional photoelectric converter, a first-optical system for sampling real parts of a two-dimensional Fourier transformation, a-second optical system for sampling cosine terms and a photoelectric converter. The device is intended to execute a cosine transformation by using a Fourier transform lens for effecting light wave transformation.

In contrast to the above mentioned prior art, the device according to the present invention, does not require complex optical systems for sampling real parts of a two-dimensional Fourier transformation and for sampling cosine terms and can execute a discrete cosine transformation on the basis of ON- and summations by means of a converging lens and a mask (spatial filter) which substitutes a basic pattern of a discrete cosine transformation by a variety of transmission.

As mentioned above, the conventional pictorial data encoding/decoding system utilizes the coding method based on "discrete cosine transform", which is featured by the relatively low compressibility of the information and complicated structure of the processing system (since a picture is divided into blocks), which neighbours are generally related with each other and which are separately processed. Since the block processing also causes a restored picture to have block separating lines thereon, it is necessary to remove said lines from the picture by using a post-processing filter which is very hard to design and manufacture, and which has a high quality and excellent performance, because of its dependence upon the picture content.

SUMMARY OF THE INVENTION

It is an object of the present invention to provide a picture compressing and restoring system which is based on the method of total picture processing by high-speed parallel optical operations, that eliminate the necessity of using a post-processing filter of the conventional system, based on the orthogonal transforming method by use of a digital computer.

It is another object of the present invention to provide a method for forming patterns to be recorded in a spatial light modulator used in the proposed system.

It is another object of the present invention to provide a picture compressing and restoring system which can totally process a picture having mutually relating neighboring portions without dividing it into blocks and thereby attain a higher level of information compression and a simpler construction in comparison with any conventional system obtaining the same image quality.

It is another object of the present invention to provide a picture compressing and restoring system which can restore the original picture with no block separating lines, to eliminate the need of a post-processing filter which is required for removing the block separating lines in the conventional system and is hard to design and manufacture with excellent characteristics because it may be affected by the picture's content to be processed.

It is another object of the present invention to provide a picture compressing and restoring system which is based on the high-speed parallel optical information processing utilizing the light characteristics and can be manufactured at a very low cost by developing high accuracy optical components such as micro-lens arrays, spatial light modulators and so on, with due consideration that any conventional picture compressing method based on orthogonal transformation by using an existing digital computer which is required to execute mathematical operations at very high speeds and makes the system expensive.

It is another object of the present invention to provide a picture compressing and restoring system which is capable of compensating distortion and optical axis displacement of an original picture projected through a micro-lens array onto each of orthogonal function patterns recorded in a spatial light modulator for orthogonal transformation by previously multiplying each orthogonal function pattern by an inverse value of the transmission characteristic of each corresponding one of the micro-lenses so as to reduce the accuracy requirement of the micro-lenses (it is technologically difficult to make an array of micro-lenses all having the ideal distortion-free transmission characteristic) and to make it easier to manufacture the micro-lens array.

It is another object to provide a time multi-expanding method which performs multiplications upon an original picture in comparison with each of the orthogonal function patterns recorded in a space light modulator for orthogonal transformation and which sequentially extracts expansion coefficients of the orthogonal functions in the direction of the time base. The expansion coefficients are quantized and encoded and thus compressed data is transmitted to a picture restoring section wherein a restored picture is obtained.

It is yet another object to provide a space multi-expanding method which projects an original picture through a two-dimensional lens array onto each of the orthogonal functional patterns recorded in a mask for orthogonal transformation and which performs multiplications on the original picture in comparison with all recorded patterns at the same time. Expansion coefficients of orthogonal functions are determined by an array of light receiving elements and are quantized and encoded, and thereby the compressed data is transmitted to a picture restoring section.

It is yet a further object to provide a time-and-space multi-expanding method which projects an original picture through a two-dimensional lens array onto each of the orthogonal function patterns recorded in a light modulator for orthogonal transformation and which performs parallel and sequential multiplications upon the original picture in comparison with all the recorded patterns. Expansion coefficients of the orthogonal functions are determined by an array of light receiving elements and are quantized and encoded. Then the compressed data is transmitted to a picture restoring section.

The above-mentioned three methods provide a two-way type picture compressing and restoring system by applying the same types of optical systems in to their picture compressing sections and picture restoring sections.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention and wherein:

FIG. 2 is a view showing the basic picture of a conventional two-dimensional discrete cosine transform (DCT).

FIG. 3 is a view for explaining a conventional two-dimensional DCT.

PREFERRED EMBODIMENT OF THE INVENTION

Figure 1:
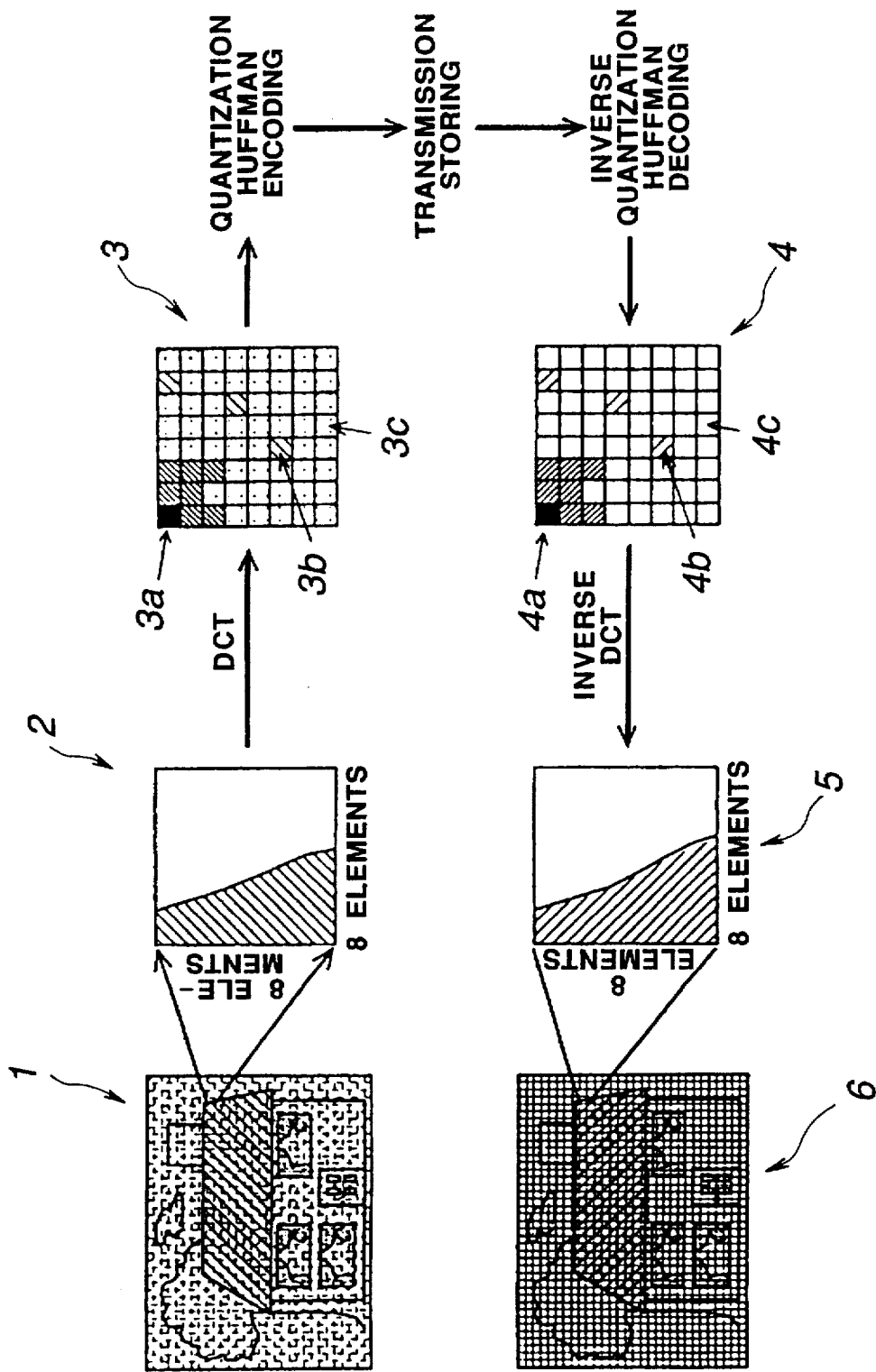
FIG. 1 is a flow chart showing the processing operation of a conventional picture encoding and decoding system.

The above-mentioned recommended or standardized systems for encoding pictorial data divide an original picture 51 into small blocks of 8×8 elements each as shown in FIG. 1 and apply two-dimensional orthogonal transformations (discrete cosine transform) of each block to reduce the spatial redundancy of the pictorial data. They obtain coefficients 53 therefrom, among which 3a is a large value, 3b is a small value and 3c is a very small value. When encoding a moving picture, these systems reduce the time redundancy of the picture information by detecting its movement and by using the data on the movement.

Since the above-mentioned conventional technique for encoding and restoring pictures is based on the existing digital processing method and is limited by the processing speed of the computer to be applied, it is necessary to divide a picture into a number of smaller picture blocks and to process each of them.

In FIG. 1, there is shown a conventional system for encoding and restoring pictorial data as an example of an internationally standardized processing. For instance, a whole picture consisting of 500 elements in rows and 700 elements in columns is divided into proper squares of 8×8 elements each. Each block is subjected to discrete cosine transformation (DCT) by using a two-dimensional DCT basic picture shown in FIG. 2. When highly meaningful portions having high coefficients of DCT are encoded and transmitted as shown in FIG. 3.

In a picture restoring section, the values transmitted from the compressing section are decoded into the initial DCT coefficients 4 (4a is a large value and 4b is a small value and 4c is a zero value) and an intermediate picture comprising square blocks of 8×8 elements each is obtained by using a previously prepared set of a cosine series. The intermediate picture 5 is subjected to filtering by a post-processing filter to remove the lines separating the blocks of the reproduced picture. The original picture 6 is thus restored.

For orthogonal transformation by this encoding system many operations (multiplication and summation) must be performed. Accordingly, high-speed processing is required to encode or restore a moving picture in real time. The standardized system for encoding and restoring pictorial data provides only a basic sequence of picture encoding and does not include pre-processings and post-processings e.g. filtering for improving the picture quality.

Figure 4:
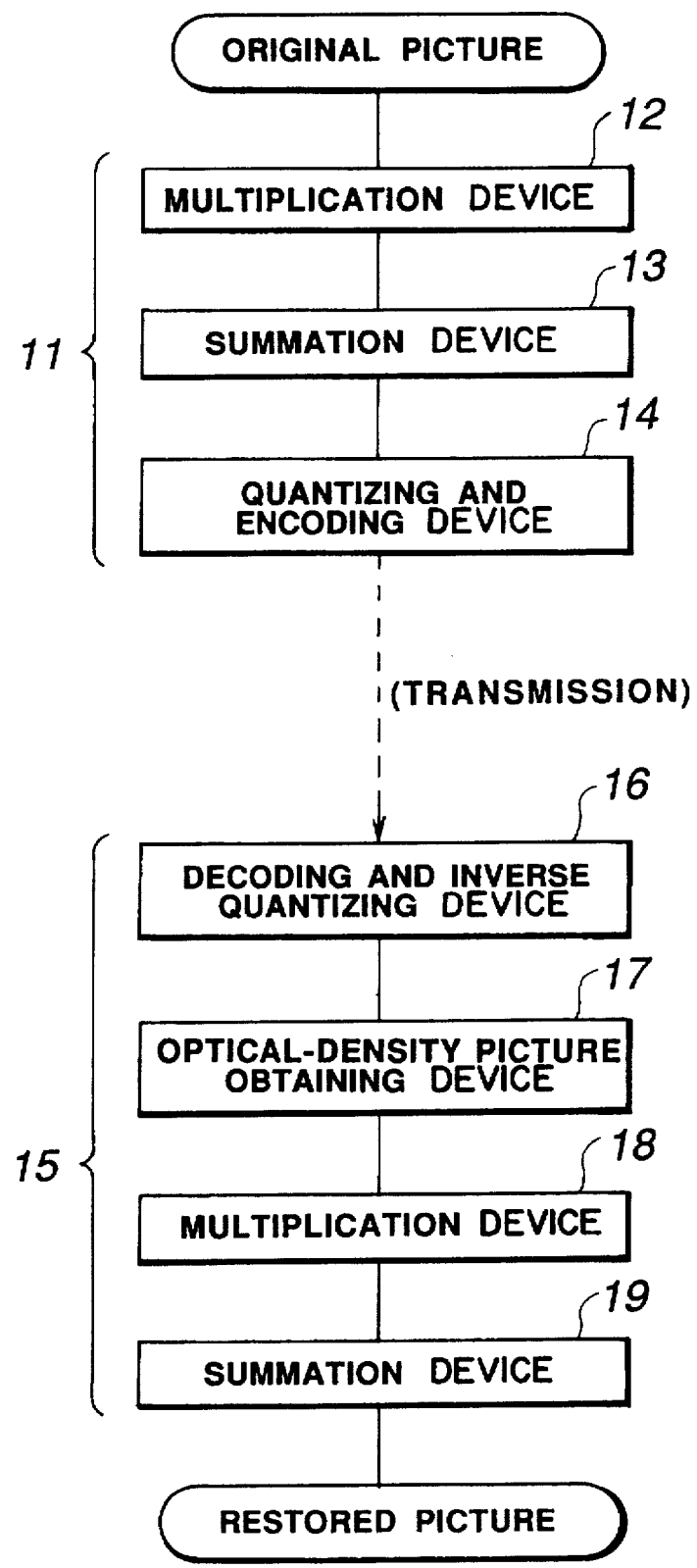
FIG. 4 is a block diagram for explaining the construction of a picture compressing and restoring system embodying the present invention.

Referring now to the accompanying drawings, the preferred embodiments of the present invention will be described in detail as follows:

FIG. 4 is a schematic diagram of a picture compressing and restoring system embodied in the present invention, which comprises a picture compressing section 11, a multiplication device 12, a summation device 13, a quantizing and encoding device 14, a picture restoring section 15, a decoding and inverse quantizing device 16, an optical (light) density picture obtaining device 17, a multiplication device 18 and a summation means 19.

The multiplication means 12 (Light modulator for orthogonal transformation, a Mask for orthogonal transformation), memorizes a series of optical density figures representing a series of orthogonal function patterns and performs optical multiplications upon an original picture in comparison with each of the orthogonal function patterns. A summation device 13 (Condenser lens, Light-receiving element, an array of light-receiving elements) determines the orthogonal function expanding coefficients from the results of the operations made by the multiplication device 12. A quantizing and encoding device 14 quantizes and encodes the orthogonal function expanding coefficients obtained by the summation device 13. The above-mentioned multiplication device 12, summation device 13 and the quantizing and encoding device 14 compose a picture compressing section. The decoding and inversely quantizing device 16 decodes a sequence of data encoded by the picture compressing section into the orthogonal function expanding coefficients. The optical density picture obtaining device 17 provides optical density pictures with a uniform brightness in accordance with the values of the orthogonal function expanding coefficients obtained by the decoding and inverse quantizing device 16. The multiplication device 18 (Light modulator for orthogonal transformation, Mask for orthogonal transformation) conducts multiplications upon the optical density picture obtained by the optical density picture obtaining device 17 in comparison with the recorded orthogonal function patterns that get images of picture elements corresponding to the orthogonal function expanding coefficients. The summation device 19 (Two-dimensional array of lenses, Screen) optically superimposes the images of the picture elements on each other. The above-mentioned decoding and invese quantizing device 16, optical density picture obtaining device 17, the multiplication device 18 and the summation device 19 make up a picture restoring section.

The present invention provides three types of picture compressing and restoring systems:

(1) A time multi-expanding type that expands the orthogonal function expansion coefficients on a time basis;

(2) A space multi-expanding type that expands the orthogonal function expansion coefficients on a two-dimensional plane.

(3) A time-and-space multi-expanding type that expands the orthogonal function expansion coefficients both on a time base and a two-dimensional plane.

Figure 5:
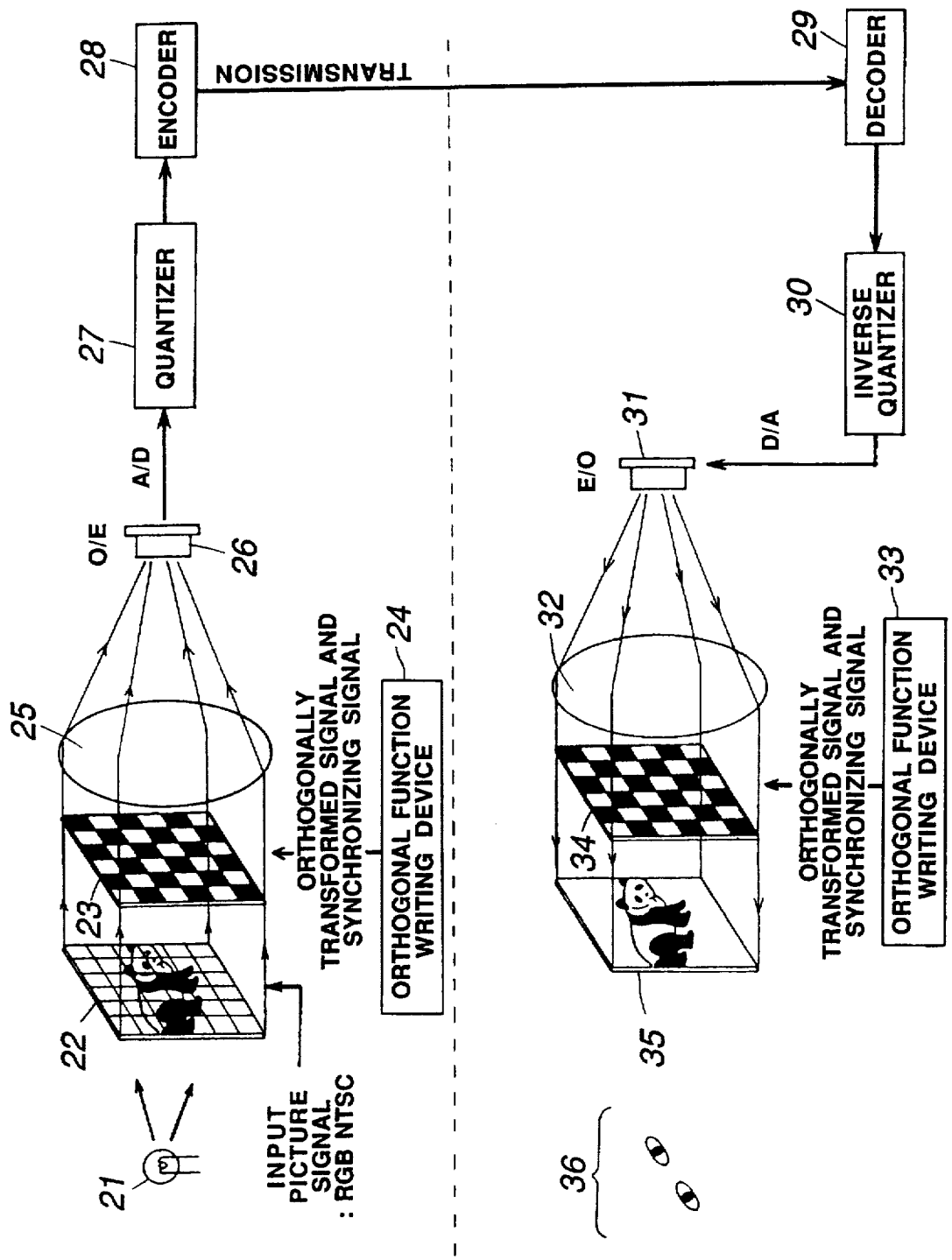
FIG. 5 is a view for explaining a time multi-expanding type picture compressing and restoring system according to the present invention.

The above-mentioned methods will be described each as follows:

FIG. 5 is a schematic diagram of an example of a time multi-expanding type picture compressing and restoring system embodying the present invention, which includes a light, source 21, a liquid crystal television display (LCTV) 22, a spatial light modulator (SLM) 23 for orthogonal transformation, an orthogonal function writing device 24, a condenser lens 25, a light-receiving photodiode (PD) 26, a quantizer 27, an encoder 28, a decoder 29, an inverse quantizer 30, a light-emitting diode (LED) 31, a condenser lens 32, an orthogonal function writing device 33, a spatial light modulator (SLM) 34 for orthogonal transformation, a screen 35 and a watcher's eyes 36.

The time multi-expanding type picture compressing and restoring system comprises a picture compressing section and a picture restoring section and can obtain all of the orthogonal function expanding coefficients within a certain duration of time by performing optical multiplications upon a picture projected on a series of orthogonal functional patterns renewable with time by use of a spatial light modulator which is capable of fast rewriting function patterns.

The picture compressing section is composed of a light source 21, a liquid crystal TV display 22, a spatial light modulator for orthogonal transformation (an optical multiplication portion) 23, an orthogonal function writing device 24, a condenser lens 25, a light-receiving element 26, a quantizer 27 and an encoder 28. The condenser lens 25 and the light-receiving element 26 make up an optical summation portion. An original picture (of a giant panda in the shown case) as a video signal of NTSC (National Television System Committee Color System) is input to the liquid crystal TV display 22 and illuminated from the back by the light source 21. Orthogonal function patterns in the form of varied optical density figures are written serially by the orthogonal function recording device 24 into the spatial light modulator 23 for orthogonal transformation. Optical multiplications 23 are done upon the original picture on the liquid crystal TV display 22 in comparison with each of the orthogonal function patterns to extract therefrom corresponding expansion coefficients in the time base direction which is then input into the light-receiving element 26 through the condenser lens 25. The light-receiving element 26 and the condenser lens 25 compose the optical summation device. The analog signal input into the light receiving element 26 is converted to a digital signal which is quantized and encoded. The spatial light modulator 23 for orthogonal transformation must have an ultra-high response (-nsec). The encoder 28 compresses data by distributing shorter codes to frequently occurring symbols and longer codes to less occurring symbols. Huffman encoding is applied in this case.

The picture restoring section is composed of a decoder 29, an inverse quantizer 30, a light-emitting element 31, a condenser lens 32, an orthogonal function writing device 33, a spatial light modulator 34 for orthogonal transformation and a screen 35. In this section, the encoded data serially and electrically transmitted from the picture compressing section are decoded and restored into corresponding expansion coefficients of the orthogonal functions by the decoder 29 and the inverse quantizer 30. The light-emitting element 31 emits light depending upon a value of each expansion coefficient and forms a light source surface with the condenser lens 32. Optical multiplications are carried out upon the light source surface in comparison with each of the orthogonal function patterns corresponding to the orthogonal function expanding coefficients serially written into the spatial light modulator 34 by use of the orthogonal function recording device 33. The results of the operations are time multiplexed and superimposed on each other to reproduce a picture corresponding to the original which can be observed by human eyes 36 on the screen 35.

The time expanding method requires a high-speed response (high rewriting speed) of the spatial light modulators 23 and 34 to assure the time-base expansion of the coefficients (series) of orthogonal functions representing a picture. For example, when an original picture consists of 640 horizontal pixels and 480 vertical pixels and has a duration of 30 msec, it must have 326 and 400 expansion coefficients of the orthogonal functions. To get all of the above mentioned coefficients the spatial light modulators 23 and 34 are required to have a response speed of about 0.1 μsec. However, if the number of the orthogonal function expansion coefficients can be reduced to $\frac{1}{10}$ (by cutting off HF components), the required response speed of the spatial light modulators 23 and 34 decreases to about 1 μsec.

When an original picture image on the liquid crystal TV display 22 and the restored picture image on the screen 35 are of the same magnification (i.e., 1:1), the required resolution of the spatial light modulators 23 and 34 may be the same as that of the liquid crystal TV display 22.

The picture compressing section and the picture restoring section can use the same spatial light modulators 23 and 34 and condenser lenses 25 and 32. Accordingly, a complete two-way type picture compressing and restoring system can be constructed by applying the same type of optical writing spatial light modulators 23 and 34 for the liquid crystal TV display 22 and the screen 35 and by integrally forming the light-receiving element 26 with the light emitting element 31, the quantizer 27 with the inverse quantizer 30, encoder 28 with decoder 29, respectively.

Figure 6:
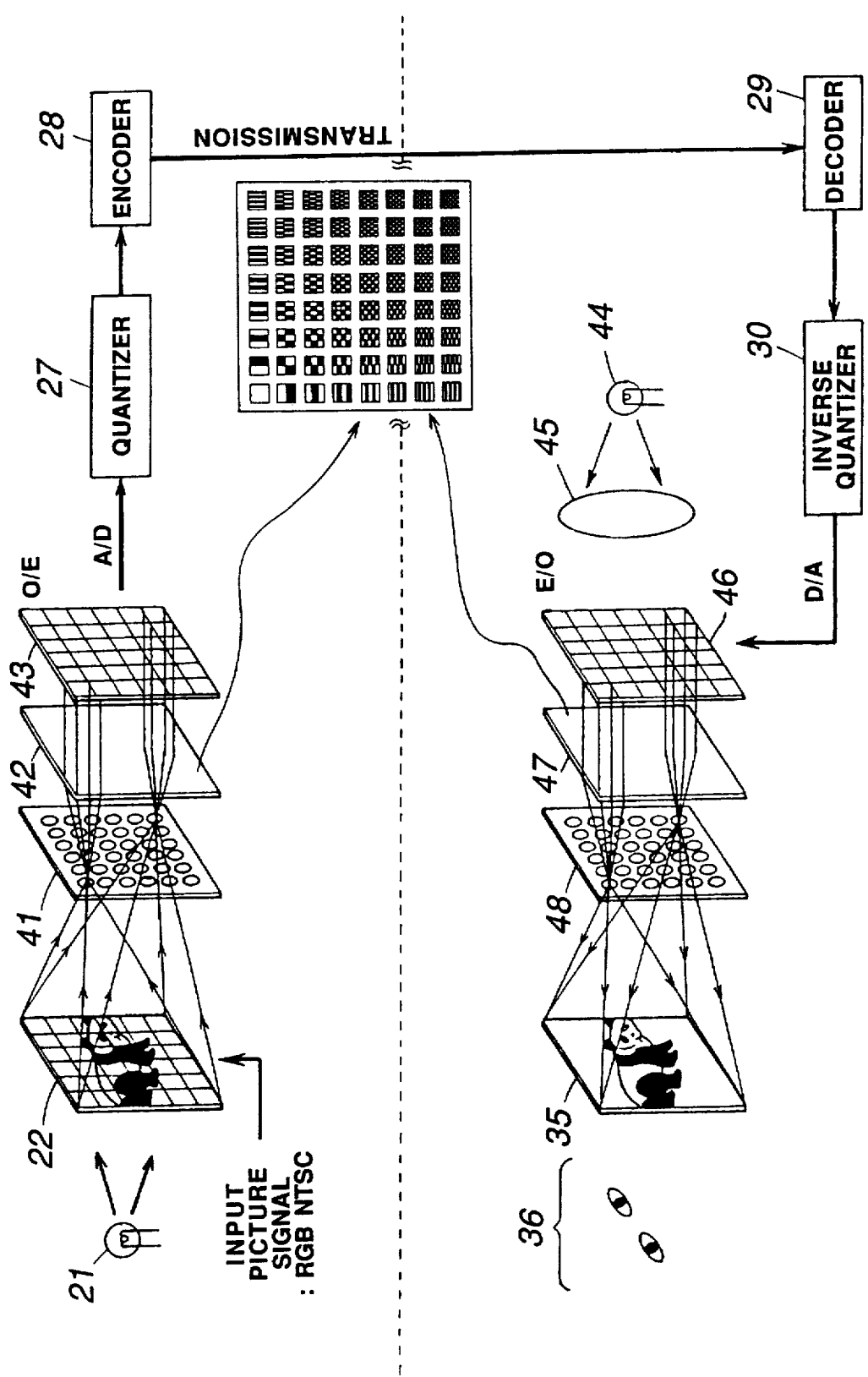
FIG. 6 is a view for explaining a space multi-expanding type picture compressing and restoring system according to the present invention.

FIG. 6 is a schematic diagram for explaining an example of a space multi-expanding type picture compressing and restoring system according to the present invention. In FIG. 6, there are shown a two-dimensional lens array (picture distributor) 41, a mask for orthogonal transformation (optical multiplication portion) 42, a light-receiving element array (optical summation portion) 43, a light source 44, a condenser lens 45, a liquid crystal TV display 46, an orthogonal transform mask 47 and a two-dimensional lens array 48. Other like functioning parts as those shown in FIG. 5 are denoted by like referenced numerals.

This space multi-expanding method differs from the time multi-expanding method shown in FIG. 5 by a number of the same original picture images distributed on a space plane through a two-dimensional array of micro-lenses so as to parallel and simultaneously obtain therefrom orthogonal function expanding coefficients. In other words, the optical operation portion comprising the time-base image-distributing type spatial light modulator 23 and the orthogonal function writing device 24 of the time multi-expanding method shown in FIG. 5 is exchanged for a parallel operation portion for spatially distributed original images comprising the image distributor 41 and the orthogonal transformation mask 42 shown in FIG. 6.

The picture compressing section comprises a light source 21, a liquid crystal TV display 22, a two-dimensional array of lenses 41, an orthogonal transform mask 42, an array of light receiving elements 43, a quantizer 27 and an encoder 2B.

The mask 42 for orthogonal transformation has blocks wherein a series of orthogonal function patterns in the form of corresponding optical density figures are recorded. The original picture shown on the liquid crystal TV display 22 is projected through the two-dimensional arrayed lenses 41 onto the optical density figures in the function pattern block (function terms) of the mask 42 and optical multiplications are conducted simultaneously at all blocks of the mask 42. The values of picture elements per block, which are the result of the operations per block of the mask 42, are logically summed up on the respective light-receiving elements 43 (in an array) to get the respective expansion coefficients of the orthogonal functions. A set of function expansion coefficients corresponding to all blocks of the mask 42 are encoded by the quantizer 27 and the encoder 28. The original picture information is thus compressed. The two-dimensional arrayed lenses 41, mask 42 and light-receiving elements 43 can be integrally formed by adhesion.

The picture restoring section is comprised of a decoder 29, an inverse quantizer 30, a light source 44, a condenser lens 45, a liquid crystal TV display 46, a mask for orthogonal transformation 47, a two-dimensional array of lenses 48 and a screen 35. A series of the encoded data transmitted from the picture compressing section are restored by the decoder 29 and the inverse quantizer 30 into the corresponding expansion coefficients of the orthogonal functions which are then displayed as gradation signals of the respective picture elements of the liquid crystal TV display 46. Accordingly, each of the picture elements on the liquid crystal TV display 46 is illuminated by the light source 44 and becomes a light source that brightens in accordance with the value of the corresponding function expanding coefficient. Each of these light sources is uniform within an area of one element and has a one-to-one correspondence with a corresponding block of the mask 47. When light rays from these light sources pass through an image of the orthogonal function patterns recorded in the mask 47 for orthogonal transformation, optical multiplications occur parallel and simultaneously on every block of the mask 47. The obtained block images are spatially superimposed on each other through the two-dimensional array of the lenses 48, thereby the original picture is reproduced on the screen 35. The liquid crystal TV display 46, the mask 47 and the two-dimensional array of lenses 48 can be integrally formed by adhesion.

The above-mentioned space multi-expanding method requires a high resolution of the mask 42 and 47 for orthogonal transformation to expand the orthogonal function expanding coefficients of the picture image on a two-dimensional plane, i.e. The masks are each required to record a squared number of picture elements of the liquid crystal TV display 22 for displaying the original picture. For instance, in case of getting all DCT coefficients (326 and 400 pcs) for an original picture consisting of 640 horizontal elements and 480 vertical elements it is necessary to use orthogonal transformation masks having about $1 \times 10^{11}$ picture elements each. If the masks are of 100 mm in horizontal direction and 75 mm in vertical direction, their resolution is 2048 lp/mm.

To obtain all DCT coefficients each of the two-dimensional lens arrays 41 and 48 must have the same quantity of lenses as the number of picture elements of the liquid crystal TV display 22. However, if the number of the orthogonal function expanding coefficients is reduced to 1/10 (by cutting off HF components), the required number of picture elements of each orthogonal transformation mask decreases to 1/100. Its resolution decreases to 1/10 and the quantity of lenses in a two-dimensional lens array is reduced to 1/10.

The picture compressing and picture restoring sections can use the same type of spatial light modulators 42, 47 and the same type of two-dimensional lens array 41, 48. Accordingly, a complete two-way type picture compressing and restoring system can be constructed by applying the same optical writing type spatial light modulators 23 and 34 for the liquid crystal television display 22 and the screen 35 and by integrally forming the light-receiving element array 43 with the light source portion (the light source 44, the condenser lens 45 and the liquid crystal TV display 46), the quantizer 27 with the inverse quantizer 30, the encoder 28 with the decoder 29 respectively.

Figure 7:
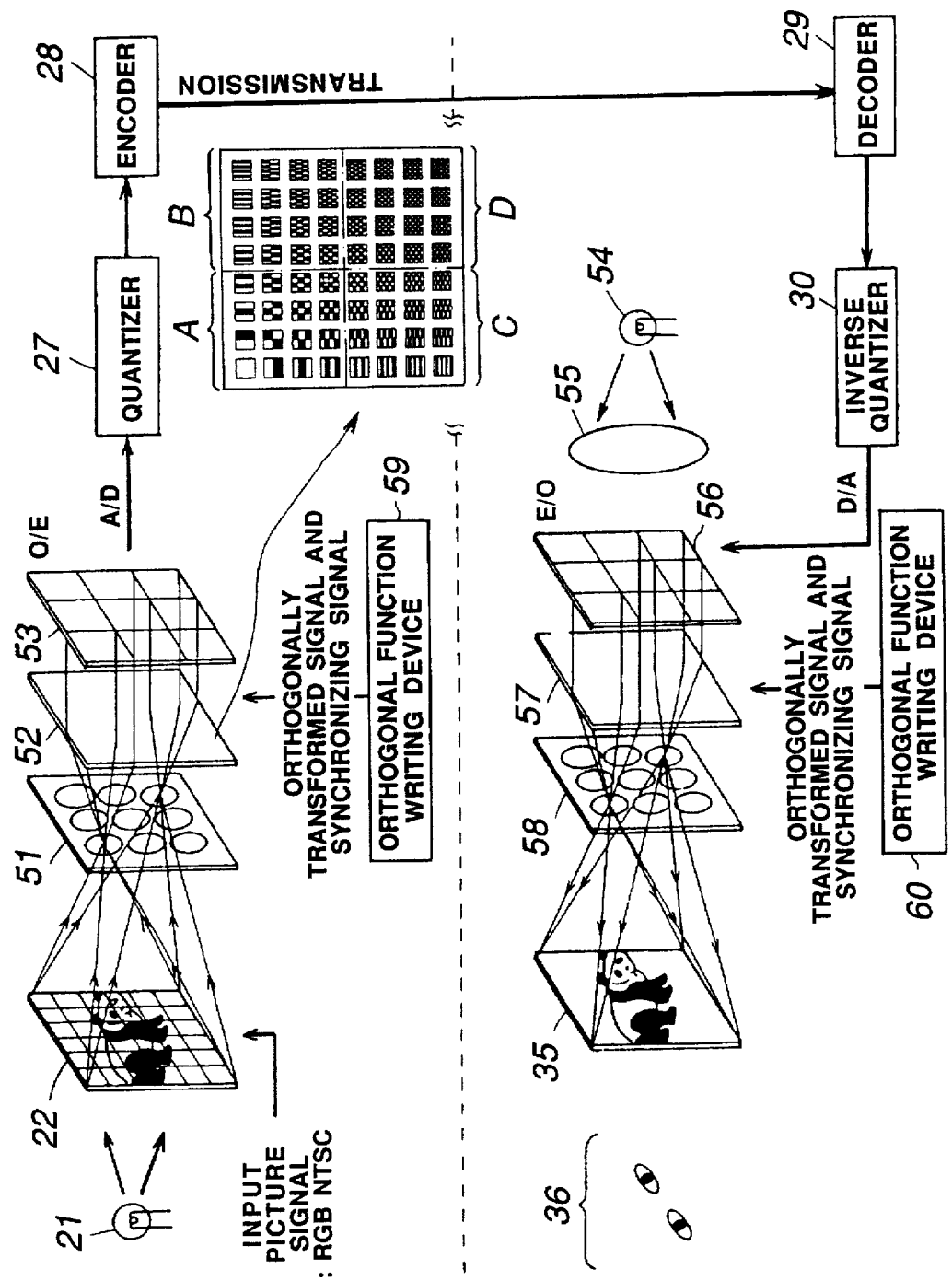
FIG. 7 is a view for explaining a time-and-space multi-expanding type picture compressing and restoring system according to the present invention.

FIG. 7 is a schematic diagram for explaining an example of a time-and-space multi-expanding type picture coding and restoring system according to the present invention. In FIG. 7, 51 is a two-dimensional lens array (picture distributor), 52 is a light modulator for orthogonal transformation (optical multiplication portion), 53 is a light-receiving element array (optical summation portion), 54 is a light source, 55 is a condenser lens, 56 is a liquid crystal TV display, 57 is a mask for orthogonal transformation and 58 is a two-dimensional lens array. Other like functioning parts as those shown in FIG. 5 are denoted by like referenced numerals.

The time multi-expanding method shown in FIG. 5 is such that all of the orthogonal function expanding coefficients are obtained within a certain duration of time by conducting optical multiplications one at a time of every orthogonal function patterns with a projected (thereto) original picture by means of a spatial light modulator which is capable of serially rewriting functional patterns at a high speed.

The space multi-expanding method shown in FIG. 6 is such that an original picture is evenly projected through a two-dimensional array of lenses on all orthogonal function patterns previously recorded in a spatial light modulator and optical multiplications upon the original picture with all function patterns conducted in parallel at a time, thereby all expansion coefficients of the orthogonal functions can be obtained at the same time.

The time-and-space expanding method shown in FIG. 7 is a combination of the above-mentioned two methods, which will be explained by way of example in the case that multiplications upon an original picture with every orthogonal function pattern must be conducted N×M times to obtain a series of orthogonal function expanding coefficients and therefore a spatial light modulator capable of previously recording N pieces of orthogonal function patterns therein and renewing them serially at a high speed is used.

An original picture is projected evenly and simultaneously onto the N orthogonal function patterns in the spatial light modulator through a two-dimensional lens array and optical multiplications are conducted N times in parallel at all orthogonal function patterns in relation to the thereto projected original picture to simultaneously get the N pieces of the orthogonal function expanding coefficients. Further, the N pieces of orthogonal patterns in the spatial light modulator are rewritten into N pieces of successive patterns and multiplications are conducted N times in parallel at a time upon all these patterns in relation with the original picture projected thereon through the two dimensional lens array. The parallel optical multiplications on N renewable orthogonal function patterns are repeated serially by M times to get all (N×M pieces) of required expansion coefficients of the orthogonal functions.

The picture compressing section comprises a light source 21, a liquid crystal TV display 22, a two-dimensional array of lenses 51, a spatial light modulator for orthogonal transformation 52, an array of light receiving elements 53, a quantizer 27 and an encoder 28.

The spatial light modulator 52 for orthogonal transformation has blocks wherein a series of orthogonal function patterns in the form of corresponding optical density figures are recorded. The original picture shown on the liquid crystal TV display 22 is projected through the two-dimensional lens array 51 onto every optical density figure in the function pattern blocks (function terms) of the spatial light modulator 52 and optical multiplications are conducted in parallel and serially at every block of the spatial light modulator 52. For example, in the case that multiplications of orthogonal function patterns in relation to an original picture are performed serially from A to D blocks of the spatial light modulator but simultaneously within each block. The values of the picture elements, per block, which are logical products of the spatial light modulator 52, are logically summed up on the respective light-receiving elements 53 (in an array) to get the respective expansion coefficients of the orthogonal functions. A set of function expanding coefficients for all the blocks of the spatial light modulator 52 are digitized by the quantizer 27 and the encoder 28. The original picture information is thus compressed.

The picture restoring section is composed of a decoder 29, an inverse quantizer 30, a light source 54, a condenser lens 55, a liquid crystal TV display 56, a spatial light modulator for orthogonal transformation 57, a two-dimensional array of lenses 58 and a screen 35. A series of the encoded data transmitted from the picture compressing section are restored by the decoder 29 and the inverse quantizer 30 into the corresponding expansion coefficients of the orthogonal functions which are displayed, each as gradation signals, at the respective picture elements of the liquid crystal TV display 56. Accordingly, each of the picture elements on the liquid crystal TV display 56 is illuminated by the light source 54 and becomes a light source that brightens up in accordance with the value of the expansion coefficient of the functions. Each of these light sources is uniform within an area of one element and has a one-to-one correspondence with a corresponding block of the spatial light modulator 57. When light rays from these light sources pass through an image of the orthogonal function patterns recorded in the spatial light modulator 57 for orthogonal transformation, optical multiplications occur parallel and simultaneously at every block of the modulator 57. The obtained block images are spatially superimposed through the two-dimensional array of the lenses 58, thereby the original picture is reproduced on the screen 35.

With this method, it is also possible to construct a complete two-way type picture compressing and restoring system in a similar way as the two preceding methods.

As previously described, the time multi-expanding method requires the ultra-high speed response of a spatial light modulator for orthogonal transformation, and the space multi-expanding method requires the high resolution of both two-dimensional lens array and the orthogonal transformation mask. Accordingly, in case of the time-and-space multi-expanding method it is possible to reduce the required response speed and resolution of the components by distributing the orthogonal function expanding coefficients to both time and space.

A method for forming orthogonal function patterns will be explained as follows:

This relates to a system comprising a two-dimensional lens array (picture distributor) and a mask for orthogonal transformation, which are used in the space multi-expanding type shown in FIG. 6, and also to a system comprising a two-dimensional lens array (picture distributor) and a spatial light modulator for orthogonal transformation, which are used in the time-and-space multi-expanding type system shown in FIG. 7.

If the n-th term of an orthogonal function is denoted by $R(n)$, the distortion-free picture distributor has an image transmission characteristic (G) of 1 and therefore an orthogonal function pattern to be recorded in the spatial light modulator will be expressed as $R(n) \times (1/G) = R(n)$ that represents an original orthogonal function pattern.

The pattern forming method which is capable of realizing the same effect as that of the ideal distortionless image distributor by using an existing image distributor not being free from image distortion, is such that the spatial light modulator is forcibly compensated for a distorted image transmission (characteristic G) by giving thereto a distortion orthogonal function pattern obtained by multiplying a normal orthogonal function pattern by a distortion compensating characteristic, i.e., $R(n) \times (1/G)$, where $R(n)$—the n-th term of the orthogonal function system.

Table 1 is a comparison table in which technical specifications of the main devices of the time multi-expanding system, the space multi-expanding system and the time-and-space multi-expanding system are shown for comparison.

TABLE 1

Comparison of Specifications of Main Devices of Three Expansion Systems

| Main Devices | (1) Time Multi-Expansion System | (2) Space Multi-Expansion System | (3) Time-and-Space Multi-Expansion System | Existing Devices (Specifications) |
| --- | --- | --- | --- | --- |
| Light source | Incoherent light source is applicable. | | | |
| Liquid crystal television display (for input picture) (for orthogonal. function expansion coefficients) | Number of picture elements: 640(H) × 480 (V) Resolution: 3.2 lp/mm Size: 100(H) × 75(V) mm Response: 30 msec/frame | The same as mentioned for the system (1).1 ← | The same as mentioned for the system (1). ← | The same as mentioned for the system (1). ← |
| Two-dimensional lens array | Unnecessary | Number of lenses: 640(H) × 480(V) Resolution: 6.4 pcs/mm Size: 100(H) × 75(V) mm | Number of lenses: 640(H) × 480(V) Resolution: 2 pcs/mm Size: 100(H) × 75(V) mm | Resolution: about 5–6 pcs/mm |
| Mask for orthogonal transformation | Unnecessary | Number of picture elements: $(640 \times 480)^2$ Resolution: 2048 lp/mm Size: 100(H) × 75(V) mm | Unnecessary | Resolution: 1500 lp/mm (Photosensitive material) |
| Spatial light modulator for orthogonal transformation | Number of picture elements: 640(H) × 480(V) Resolution: 3.2 lp/mm Size: 100(H) × 75(V) mm Response: 0.1 μsec/frame | Unnecessary Resolution: 200 lp/mm | Number of picture elements: $(200 \times 150)^2$ Resolution: 200 lp/mm Size: 100(H) × 75(V) mm Response: 30 msec/frame | Resolution: 200 lp/mm Response: 70 μsec/line |
| Array of light receiving elements | Unnecessary (Only one light receiving element is required.) | Number of picture elements: 640(H) × 480(V) Resolution: 3.2 lp/mm Size: 100(H) × 75(V) mm | Number of picture elements: 200(H) × 150(V) Resolution: 1 lp/mm Size: 100(H) × 75(V) mm | Number of picture elements: 768(H) × 490(V) (High resolution CCD) |
| Features of method | Expansion of orthogonal function coefficients at a time base | Expansion of orthogonal function coefficients at a two-dimensional plane | Expansion of orthogonal function coefficients at a time-base and a two-dimensional plane | |
| Most important points | Response speed of the spatial light modulator (SLM) for orthogonal transformation | Image forming quality of the two-dimensional lens array | Response speed of the SLM for orthogonal transformation and image forming quality of the two-dimensional lens array | |

The time multi-expanding system has no need for use of a two-dimensional lens array, a mask for orthogonal transformation and an array of light receiving elements, but it needs a light receiving element and a spatial light modulator for orthogonal transformation. The most important point of this method is to require an ultra-high speed response to the spatial light modulator for orthogonal transformation.

The space multi-expanding system has no need for use of a spatial light modulator for orthogonal transformation but it needs a two-dimensional lens array, a mask for orthogonal transformation and a light-receiving element array. The most important point of the method is to assure high quality of the image formed by the two-dimensional lens array.

The time-and-space multi-expanding system has no need to use a mask for orthogonal transformation but it needs a two-dimensional lens array, a spatial light modulator for orthogonal transformation and an array of light-receiving elements. The most important point of the method is to assure an ultra-high speed response to the spatial light modulator for orthogonal transformation and a high quality image formed by the two-dimensional lens array.

The above-mentioned three systems may be applied depending upon the required processing speed and its application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An image compressing and restoring system, comprising:

an image compressing section including, multiplication means for storing a series of orthogonal function patterns in the form of varied optical density figures and for optically multiplying a projected image by each of the orthogonal function patterns, summation means for receiving the optically multiplied projected image for each of the orthogonal function patterns and for producing expansion coefficients of orthogonal functions for the entire projected image, and quantizing and encoding means for quantizing and encoding the produced expansion coefficients; and an image restoring section including decoding and inverse quantizing means for restoring the previously encoded and quantized expansion coefficients into orthogonal function expansion coefficients, optical density picture obtaining means for obtaining a uniformly bright optical density picture corresponding to the values of the orthogonal function expansion coefficients obtained by the decoding and inverse quantizing means, multiplication means for obtaining images of picture elements corresponding to respective orthogonal function expansion coefficients by optically multiplying the optical density picture obtained by the optical density picture obtaining means with the series of orthogonal function patterns recorded in the form of varied optical density figures, and summation means for optically superimposing the images of the picture elements obtained by the multiplication means to reform the originally projected image.

2. An image compressing and restoring system, comprising:

an image compressing section including, a spatial light modulator for storing a series of orthogonal function patterns in the form of varied optical density figures and for performing parallel multiplications between a projected image, and each of the orthogonal function patterns, an image distributor for simultaneously projecting an original image onto each of the orthogonal function patterns of the spatial light modulator, an array of light-receiving elements for producing orthogonal function expansion coefficients for the total original image from the multiplications performed by the spatial light modulator; and a quantizing encoder for quantizing and encoding the produced orthogonal function expansion coefficients obtained by the array of light-receiving elements; and an image restoring section including, a decoding and an inverse quantizing device for restoring the quantized and encoded orthogonal function expansion coefficients into orthogonal function expansion coefficients, a light emitter for simultaneously projecting light corresponding to a value of each orthogonal function expanding coefficient obtained by the decoding and inverse quantizing device, a spatial light modulator for multiplying, in parallel, the series of orthogonal function patterns and simultaneously projecting light corresponding to a value of each orthogonal function expansion coefficient, and a two-dimensional lens array for superimposing, in time and space, images produced by the multiplications of the spatial light modulator.

3. A method for forming a pattern recordable by a spatial light modulator of an image compressing and restoring system comprising the steps of:

(a) projecting an image, by a picture distributor, onto a spatial light modulator;

(b) optically multiplying the projected image with a distorted orthogonal function pattern recorded in the spatial light modulator, the distorted orthogonal function pattern being obtainable by multiplying a normal orthogonal function pattern by a distorted compensating characteristic to compensate for a distorted characteristic of the picture distributor;

(c) producing orthogonal function expansion coefficients from the optical multiplications of step (b);

(d) encoding the produced orthogonal function expansion coefficients of step (c) to thereby compress the projected image;

(e) decoding the previously encoded orthogonal function expansion coefficients of step (d);

(f) projecting, simultaneously, light corresponding to a value of each decoded orthogonal function expansion coefficient of step (e);

(g) optically multiplying, in parallel, the series of normal orthogonal function patterns distorted by the compensating characteristic, and the simultaneously projected light of step (f); and (h) superimposing the optically multiplied images produced by the parallel optical multiplication of step (g) to thereby restore the previously compressed image.

4. The image compressing and restoring system of claim 1, wherein each of the stored orthogonal function patterns are sequentially optically multiplied by the projected image in the image compressing section and each of the series of orthogonal function patterns are sequentially optically multiplied by the optical density picture obtaining means in the image restoring section.

5. The image compressing and restoring system of claim 1, wherein at least one of the multiplication means includes a spatial light modulator.

6. The image compressing and restoring system of claim 4, wherein the produced expansion coefficients in the image compressing section, and the orthogonal function expansion coefficients in the image restoring section are time-based, sequentially generated expansion coefficients.

7. The image compressing and restoring system of claim 1, wherein the summation means of the image compressing section includes a light-receiving element.

8. The image compressing and restoring system of claim 1, further comprising:

image projection means, including a liquid crystal display device, for projecting a displayed image to the multiplying means.

9. The image compressing and restoring system of claim 5, wherein the multiplying means of the image compressing section and the image restoring section include the same spatial light modulator.

10. The image compressing and restoring system of claim 1, wherein a single condenser lens is included in the summation means of the image compressing section and the image restoring section.

11. The image compressing and restoring system of claim 5, wherein the spatial light modulator has a response speed of 0.1 μsec.

12. The image compressing and restoring system of claim 5, wherein the spatial light modulator has a response speed of 1 μsec.

13. The image compressing and restoring system of claim 9, wherein the spatial light modulator has a response speed of 0.1 μsec.

14. The image compressing and restoring system of claim 9, wherein the spatial light modulator has a response speed of 1 μsec.

15. The image compressing and restoring system of claim 2, wherein the picture distributor includes a two-dimensional lens array.

16. The image compressing and restoring system of claim 2, further comprising:

image projection means, including a liquid crystal display device, for projecting a displayed image to the picture distributor.

17. The image compressing and restoring system of claim 15, wherein the image compressing section and the image restoring section utilize the same two-dimensional lens array.

18. The image compressing and restoring system of claim 2, wherein at least one of the spatial light modulators includes an orthogonal transformation mask.

19. The image compressing and restoring system of claim 18, wherein the orthogonal transformation mask includes $1 \times 10^{11}$ elements.

20. The image compressing and restoring system of claim 18, wherein the orthogonal transformation mask includes $1 \times 10^{9}$ elements.

21. The image compressing and restoring system of claim 18, wherein the image compressing section and the image restoring section utilize the same orthogonal transformation mask.

\* \* \* \* \*